(12) United States Patent
Jaksic et al.

(10) Patent No.: US 11,451,181 B2
(45) Date of Patent: Sep. 20, 2022

(54) INVERTER CIRCUIT FOR AN ELECTRIC MACHINE

(71) Applicant: GM GLOBAL TECHNOLOGY OPERATIONS LLC, Detroit, MI (US)

(72) Inventors: Marko Jaksic, Shelby Township, MI (US); Brian A. Welchko, Oakland, MI (US); Benjamin S. Ngu, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 98 days.

(21) Appl. No.: 17/036,805

(22) Filed: Sep. 29, 2020

(65) Prior Publication Data

US 2022/0103111 A1    Mar. 31, 2022

(51) Int. Cl.
     *H02P 27/08*      (2006.01)
     *H02M 1/08*      (2006.01)
     *H02M 7/5387*      (2007.01)

(52) U.S. Cl.
     CPC ............ *H02P 27/085* (2013.01); *H02M 1/08* (2013.01); *H02M 7/53871* (2013.01)

(58) Field of Classification Search
     CPC ...... B60L 58/33; B60L 50/40; B60L 2210/14; Y02T 10/70; Y02T 90/40; H02M 1/08; H02M 7/53871; H02P 27/085
     See application file for complete search history.

(56) References Cited

U.S. PATENT DOCUMENTS

| | | | |
|---|---|---|---|
| 7,130,205 B2 * | 10/2006 | Peng ................... | H02M 7/4826 363/140 |
| 2020/0244177 A1 * | 7/2020 | Ono ..................... | H02M 1/4225 |

\* cited by examiner

*Primary Examiner* — Said Bouziane
(74) *Attorney, Agent, or Firm* — Quinn IP Law

(57) ABSTRACT

A novel power inverter system for transferring electric power between a DC power source and a multi-phase electric machine is described, and includes a power inverter, a Z-source inverter, a first switch, and a second switch. The first switch is arranged between positive and negative conductors of a high-voltage bus that is electrically coupled to the DC power source, and the second switch is arranged in-line on the positive conductor of the high-voltage bus.

20 Claims, 3 Drawing Sheets

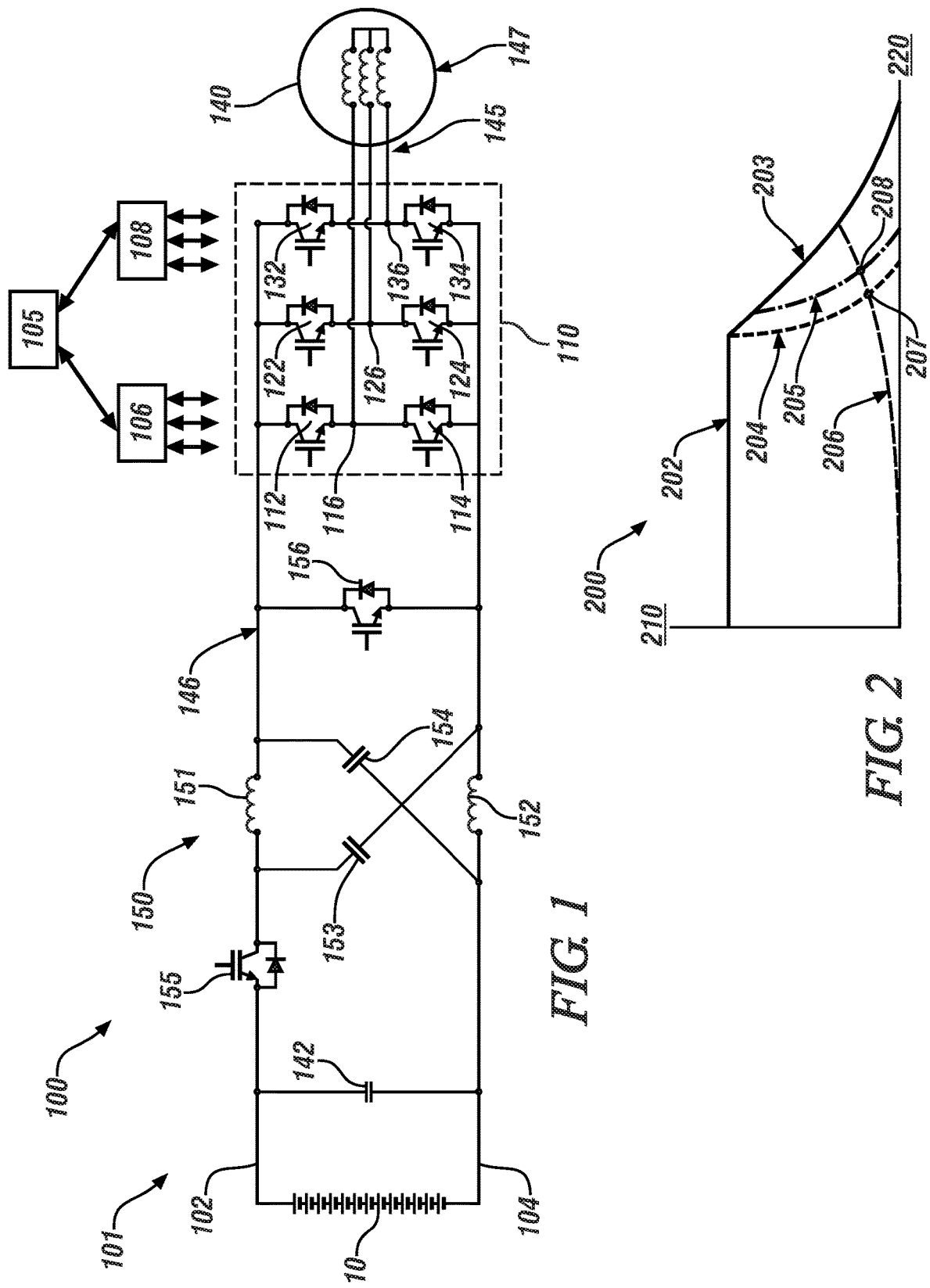

INVERTER CIRCUIT FOR AN ELECTRIC MACHINE

BACKGROUND

This disclosure relates to inverter circuits for electric motor/generators.

Electric machines, e.g., multi-phase electric motor/generators have stator windings that are energized by alternating current that is generated by power inverters that electrically connect to high-voltage DC electrical power buses. Electric machines may be employed on electrified powertrain systems. There is a benefit to reducing electric power conduction losses.

SUMMARY

A novel power inverter system for transferring electric power between a DC power source and a multi-phase electric machine is described, and includes a power inverter, a Z-source inverter, a first switch, a second switch, and a high-voltage bus including positive and negative conductors. The first switch is arranged between positive and negative conductors of a high-voltage bus that is electrically coupled to the DC power source, and the second switch is arranged in-line on the positive conductor of the high-voltage bus.

An aspect of the disclosure includes the first switch being arranged between the positive and negative conductors of the high-voltage bus and between the power inverter and the Z-source inverter.

Another aspect of the disclosure includes the Z-source inverter having a first inductor arranged in line in the positive conductor of the high-voltage bus, a second inductor arranged in line in the negative conductor of the high-voltage bus, a first capacitor arranged between a first side of the first inductor and a second side of the second inductor, and a second capacitor arranged between a second side of the first inductor and a first side of the second inductor.

Another aspect of the disclosure includes a bus capacitor being arranged between the positive and negative conductors of the high-voltage bus and arranged between the Z-source inverter and a DC power source.

Another aspect of the disclosure includes the second switch being arranged in line in the positive conductor of the high-voltage bus between the bus capacitor and the Z-source inverter.

Another aspect of the disclosure includes the first switch being an Insulated Gate Bipolar Transistor (IGBT).

Another aspect of the disclosure includes the first switch being a gallium nitride (GaN) transistor.

Another aspect of the disclosure includes the first switch and the second switch being gallium nitride (GaN) transistors.

Another aspect of the disclosure includes the first switch and the second switch being silicon carbide (SiC) transistors.

Another aspect of the disclosure includes a gate driver circuit operatively connected to the power inverter, and a controller operatively connected to the gate driver circuit, the first switch, and the second switch.

Another aspect of the disclosure includes the controller being operatively connected to the gate driver circuit, the first switch, and the second switch to control the power inverter system in a normal mode, a boost mode, or a regenerative braking mode.

Another aspect of the disclosure includes the controller being operative to control the power inverter system in the normal mode by controlling the first switch in an OFF state.

Another aspect of the disclosure includes the controller operative to control the power inverter system in the boost mode by actively controlling the first switch.

Another aspect of the disclosure includes the pulsewidth modulated duty cycle being selected to achieve a desired voltage level on the high-voltage bus.

Another aspect of the disclosure includes the controller operative to actively control the first switch and control the second switch in an ON state to control the power inverter system in the regenerative braking mode.

Another aspect of the disclosure includes a power inverter system for transferring electric power between a DC power source and a multi-phase electric machine via a high-voltage bus having a power inverter, a Z-source inverter, and a switch, wherein the switch is configured, when the power inverter system is connected to the high-voltage bus, to be arranged between positive and negative conductors of the high-voltage bus, and arranged between the positive and negative conductors of the high-voltage bus and between the power inverter and the Z-source inverter.

Another aspect of the disclosure includes the Z-source inverter being a first inductor arranged in line in the positive conductor of the high-voltage bus, a second inductor arranged in line in the negative conductor of the high-voltage bus, a first capacitor arranged between a first side of the first inductor and a second side of the second inductor, and a second capacitor arranged between a second side of the first inductor and a first side of the second inductor.

Another aspect of the disclosure includes the switch being a silicon carbide (SiC) transistor.

Another aspect of the disclosure includes a gate driver circuit operatively connected to the power inverter, and a controller operatively connected to the gate driver circuit, and the switch.

Another aspect of the disclosure includes the controller operative to control the power inverter system in a boost mode, with the controller operative to control a pulsewidth modulated duty cycle of the switch, wherein the pulsewidth modulated duty cycle is selected to achieve a desired voltage level on the high-voltage bus.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 1 schematically illustrates a first embodiment of an inverter circuit for controlling operation of a multi-phase electric machine, in accordance with the disclosure.

FIG. 2 graphically illustrates a torque-speed curve of an electric machine, e.g., an embodiment of the electric machine described with reference to FIG. 1, in accordance with the disclosure.

DETAILED DESCRIPTION

Figure 3:
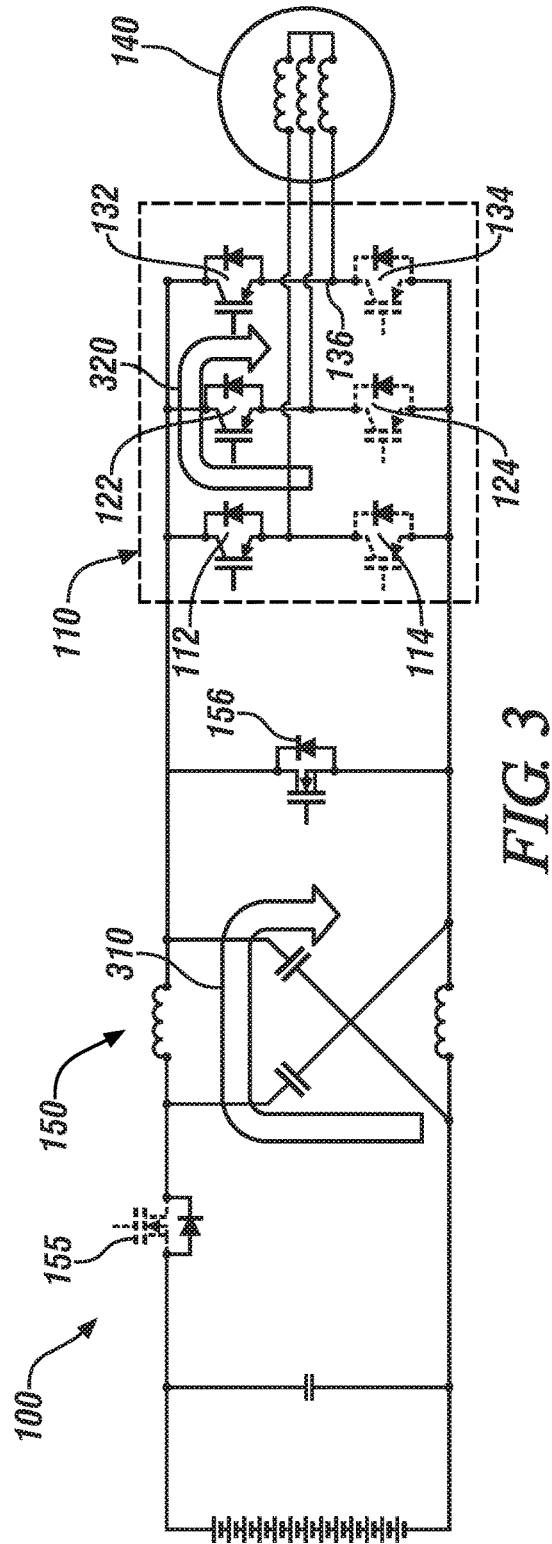
FIG. 3 schematically shows details associated with operating an embodiment of the electric power system in a first state, in accordance with the disclosure.

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein. Like reference numerals correspond to like or similar components throughout the several Figures. As used herein, the term "system" may refer to one of or a combination of mechanical and electrical hardware, sensors, controllers, application-specific integrated circuits (ASIC), combinatorial logic circuits, software, firmware, and/or other components that are arranged to provide the described functionality.

Referring now to the drawings, wherein the depictions are for the purpose of illustrating certain embodiments only and not for the purpose of limiting the same, FIG. 1 schematically illustrates an embodiment of an electric power system 100 that is arranged between a DC power source 10 and a multi-phase electric machine 140 to convert and transfer electric power therebetween. In one embodiment, the electric power system 100 and multi-phase electric machine 140 are employed on a vehicle to provide propulsion torque. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The electric power system 100 includes a power inverter 110, a first switch 156, a Z-source inverter 150, a second switch 155, and a DC bus capacitor 142 that are arranged on a high-voltage bus 101 that includes a positive conductor (HV+) 102 and a negative conductor (HV−) 104. HV+ 102 electrically connects to a positive electrode of the DC power source 10, and HV− 104 electrically connects to a negative electrode of the DC power source 10. Operations of the power inverter 110, the first switch 156, and the second switch 155 are controlled by a controller 105. In one embodiment, the multi-phase electric machine 140 is arranged on a vehicle (not shown) and coupled to one or multiple vehicle wheels to generate tractive torque for vehicle propulsion and regenerative braking.

The electric power system 100 is advantageously configured to separate unwanted switching and conduction losses that may otherwise occur in the power inverter 110, and instead employs the first switch 156 under certain operating conditions, resulting in increased efficiency. Operating the electric power system 100 in a boost state, i.e., with the first switch 156 in an ON state, i.e., conducting, charges the Z-source inverter 150, thus increasing its voltage level. This charging of the Z-source inverter 150 is accomplished with lower electrical conducting losses because the first switch 156 is activated, which would otherwise require activating two inverter switches arranged in series. This enables operation of the electric machine 140 at a boost DC voltage, which may be more efficient voltage for operating the electric machine 140 at partial load points. By way of example, the voltage level of the DC power source 10 may be 350V DC, whereas the boost DC voltage may be 425V DC, in one embodiment. Furthermore, magnitude of the boost DC voltage is controllable by selective activation of the first switch 156.

The high-voltage DC power source 10 includes a high-voltage electrical energy storage device, e.g., a high-voltage battery, a capacitor, a high-voltage electric power generator, or another related device or system.

The first switch 156 is electrically connected between HV+ 102 and HV− 104 to control electric power flow therebetween. The first switch 156 is disposed external to the power inverter 110. In one embodiment, the first switch 156 is a silicon carbide (SiC) power electronic device, e.g., a SiC MOSFET. In one embodiment, the first switch 156 is a gallium nitride (GaN) power electronic device. In one embodiment, the first switch 156 is an insulated gate bipolar transistor (IGBTs). When employed, the SiC MOSFET has a relatively low drain-to-source ON-resistance, which may be advantageously applied in systems to efficiently provide high power levels while minimizing power loss at a reduced package size as compared to other power electronic devices.

The second switch 155 is arranged in line on HV+ 102 between the bus capacitor 142 and the Z-source inverter. 150, and is configured to control electric power flow in HV+ 102. In one embodiment, the second switch 155 is a SiC MOSFET device. In one embodiment, the second switch 155 is a GaN device. In one embodiment, the second switch 155 is an IGBT device.

The DC bus capacitor 142 is arranged between HV+ 102 and HV− 104, in parallel with the DC power source 10.

The Z-source inverter 150 includes a first inductor 151, a second inductor 152, a first capacitor 153, and a second capacitor 154. The first inductor 151 is electrically connected in line in HV+ 102, and the second inductor 152 is electrically connected in line in HV− 104. The first capacitor 153 is electrically connected between a first side of the first inductor 151 and a second side of the second inductor 152. The second capacitor 154 is electrically connected between a second side of the first inductor 151 and a first side of the second inductor 152. As employed herein, the first side of the first inductor 151 is between the first inductor 151 and the DC power source 10, and the second side of the first inductor 151 is between the first inductor 151 and the power inverter 110. As employed herein, the first side of the second inductor 152 is between the second inductor 152 and the DC power source 10, and the second side of the second inductor 152 is between the second inductor 152 and the power inverter 110. The intended function of the Z-source inverter 150, in coordination with control of the ON/OFF states the first and second switches 156, 155, is to boost voltage level on the high-voltage bus 101 under certain operating conditions for the electric machine 140, which enables more efficient operation of the electric machine 140 and therefore may reduce electric power consumption.

The multi-phase electric machine 140 is configured as a three-phase permanent magnet motor/generator having stator legs arranged in a star configuration in one embodiment.

Alternatively, the multi-phase electric machine 140 may be another multi-phase configuration.

The electric power system 100 electrically connects to the high-voltage DC power source 10 via a positive high-voltage DC power bus (HV+) 102 and a negative high-voltage DC power bus (HV−) 104. The high-voltage DC power source 10 can include a high-voltage electrical energy storage device, e.g., a high-voltage battery or a capacitor, a high-voltage electric power generator or another related device or system. The inverter 140 includes a plurality of inverter switch pairs 112 and 114, 122 and 124, and 132 and 134 electrically connecting in series between HV+ 102 and HV− 104. Each of the inverter switch pairs corresponds to a phase of the multi-phase electric machine 140, with the first inverter switch connecting in series with the corresponding second inverter switch at a node. Specifically, inverter switch pairs 112 and 114 connect in series at node 116, inverter switch pairs 122 and 124 connect in series at node 126 and inverter switch pairs 132 and 134 connect in series at node 136. The nodes 116, 126 and 136 electrically connect to nominal first, second and third phases of the multi-phase electric machine 140 to transfer electric power thereto. In one embodiment, a first gate drive circuit 106 controls activation and deactivation of the first, high-side inverter switches 112, 122 and 132 and a second gate drive circuit 108 controls activation and deactivation of the second, low-side inverter switches 114, 124 and 134. Alternatively, a single gate drive circuit may be employed to control activation and deactivation of the first, high-side inverter switches 112, 122 and 132 and the second, low-side inverter switches 114, 124 and 134. The first and second gate drive circuits 106, 108 include any suitable electronic device capable of activating and deactivating the inverter switches 112 and 114, 122 and 124, and 132 and 134 to effect power transfer between one of HV+ 102 and HV− 104 and a phase of the multi-phase electric machine 140 in response to control signals originating at the controller 105.

Sensors are arranged to monitor operation of elements of the electric power system 100 and the electric machine 140, including a voltage sensor 146 that is arranged to monitor voltage on the high-voltage bus 101 proximal to the power inverter 110, one or multiple current sensors 145 that are arranged to monitor phase current between the power inverter 110 and the electric machine 140, and a rotational position sensor 147 that is arranged to monitor rotational position and speed of a rotor of the electric machine 140. The voltage sensor 146, the current sensor(s) 145, and the rotational position sensor 147 are monitored by the controller 105 as part of various control routines.

The controller 105 monitors signal inputs from the sensors and controls operation of the first and second gate drivers 106, 108 to control the power inverter 110 in a PWM mode or another mode, in response to a torque or speed command. The controller 105 generates control signals that are communicated to the first and second gate drive circuits 106, 108 to activate and deactivate the inverter switches 112 and 114, 122 and 124, and 132 and 134 in response to an inverter switch control mode that can include a pulsewidth-modulated (PWM) mode, a six-step control mode or another control mode to generate torque in a torque motoring mode or react torque to generate electric power in a regenerative braking mode. The electric power system 100 includes other electrical components including capacitors, e.g., DC bus capacitor 142, resistors, e.g., a bus resistor and other electrical circuit components to accomplish functions related to electrical noise suppression, load balancing and the like.

The electric power system 100 is operative in a normal traction mode, a boost traction mode, and a regenerative braking mode to control the electric machine 140. Operation in the normal traction mode includes controlling the second switch 155 in an ON state, i.e., activated or conducting, and controlling the first switch 156 in an OFF state, i.e., deactivated or not conducting. The inverter switches 112 and 114, 122 and 124, and 132 and 134 are controlled in a pulsewidth-modulated (PWM) mode, a six-step control mode or another control mode to control the electric machine 140 to generate tractive torque. The voltage level on the high-voltage bus 101 is equivalent to the voltage level of the DC power source 10, e.g., 350V DC in one embodiment. Operation in the boost traction mode includes controlling the second switch 155 in an ON state, and actively controlling the first switch 156 via pulsewidth modulation to increase and control the voltage level on the high-voltage bus 101 to a desired voltage level that is greater than the voltage level of the DC power source 10, allowing for more efficient operation of the electric machine 140 under partial load conditions. The pulsewidth modulated duty cycle of the first switch 156 is actively controlled to achieve the desired voltage level on the high-voltage bus 101. Again, the inverter switches 112 and 114, 122 and 124, and 132 and 134 are controlled in a pulsewidth-modulated (PWM) mode, a six-step control mode or another control mode to control the electric machine 140 to generate tractive torque. Operation in the regenerative braking mode includes controlling the second switch 155 in an ON state, either controlling the first switch 156 to an OFF state, or actively controlling the first switch 156 via pulsewidth modulation to increase and control the voltage level on the high-voltage bus 101 to a level that is greater than the voltage level of the DC power source 10, allowing for more efficient operation of the electric machine 140 in the regenerative braking mode under partial load conditions.

FIG. 2 graphically illustrates a torque-speed curve 200 of an electric machine, e.g., an embodiment of the electric machine 140 described with reference to FIG. 1, with torque 210 depicted on the vertical axis and rotational speed 220 depicted on the horizontal axis. A maximum torque 202 is indicated. An ideal field weakening torque boundary 203 is also illustrated, which indicates a maximum capability of the electric machine 140. A road load 206 is also indicated, and is determined to be the magnitude of power that is required to maintain a cruising speed of a specific vehicle on a flat surface under static wind conditions. The road load 206 is less than the maximum torque 202, as shown, and may be referred to as a partial load. Line 204 illustrates a first field weakening torque boundary that is associated with operating the electric machine 140 at a nominal operating voltage, i.e., the voltage level associated with the DC power source 10. Line 205 illustrates a second field weakening torque boundary that is associated with operating the electric machine 140 at a boosted operating voltage. This boosted operating voltage can be achieved on the high-voltage bus 101 by operation of the Z-source inverter 150 via selective control of the first and second switches 156, 155. Thus, at the partial load condition, the electric machine 140 can be operated at an increased voltage level, with corresponding increased efficiency so long as the maximum torque 202 or the ideal field weakening torque boundary 203 is not exceeded. By way of example, point 207 indicates a maximum road-load speed associated with the first field weakening torque boundary 204 when operating the electric machine 140 at the nominal operating voltage. Point 208 indicates a maximum road-load speed associated with the second field weakening torque boundary 204 when operating the electric machine 140 at the boosted operating voltage.

When the electric power system 100 and electric machine 140 are employed on a vehicle, the Z-source inverter 150 is designed and controlled to boost the DC voltage as measured on the high-voltage bus 101 for expected road loads in steady state conditions. The road load 206 is represented by a line, the magnitude of which depends on many conditions, including road grade, road friction, wind load, vehicle weight, passenger weight, payload weight, etc. Because the system is intended to not boost the output voltage at peak power conditions, the torque speed curve of the base system is relatively unchanged. This base design advantageously employs known inverter parts, ratings, and electric machines, in one embodiment. In operating, the electric power system 100 operates to boost the output voltage up to a reasonably expected maximum operating speed. The torque speed curve of the electric machine 140 is capable of operating at higher speeds, however, the efficiency of the system can suffer when the speed exceeds the field-weakening boundary. By increasing the available voltage at road load speeds, the electric machine 140 operates at a more favorable operating point, thus increasing highway speed driving efficiency.

FIG. 3 schematically shows details associated with operating an embodiment of the electric power system 100 in a first state associated with the boost mode. The electric power system 100 includes the power inverter 110, the first switch 156, the Z-source inverter 150, and the second switch 155. The power inverter 110 includes the first inverter switches 112, 122 and 132 and the second inverter switches 114, 124 and 134. In this first state, the first switch 156 is activated and the second switch 155 is deactivated. The first inverter switches 112, 122 and 132 are activated, i.e., ON, and the second inverter switches 114, 124 and 134 are deactivated, i.e., OFF. This operation occurs during a zero sequence vector operation. Arrow 310 indicates power flow through the Z-source inverter 150, and Arrow 320 indicates power flow through the first inverter switches 112, 122 and 132. This operation serves to reduce conduction losses on the phase leg by not conducting through two of the inverter switches during the boost mode, and dissipates the loss in the first switch 156.

Figure 4:
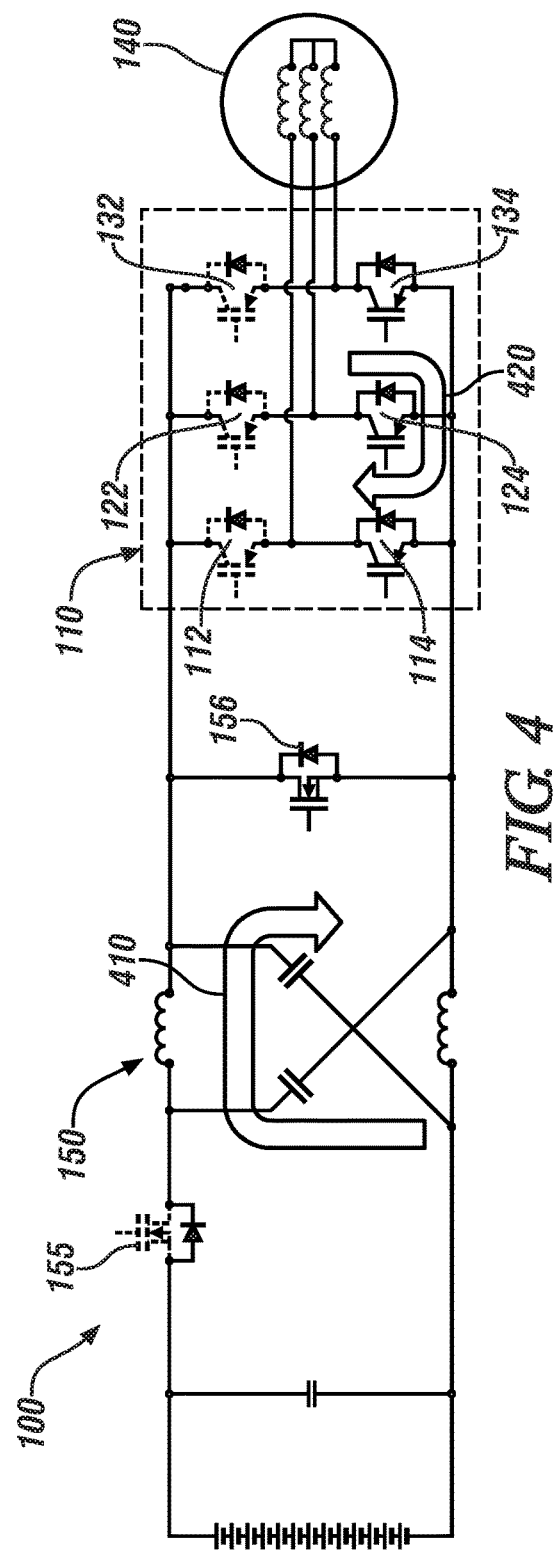
FIG. 4 schematically shows details associated with operating an embodiment of the electric power system in a second state, in accordance with the disclosure.

FIG. 4 schematically shows details associated with operating an embodiment of the electric power system 100 in a second state associated with the boost mode. In this second state, the first switch 156 is activated and the second switch 155 is deactivated, In the second state associated with the boost mode, the first inverter switches 112, 122 and 132 are deactivated and the second inverter switches 114, 124 and 134 are activated. Arrow 410 indicates power flow through the Z-source inverter 150, and Arrow 420 indicates power flow through the second inverter switches 114, 124 and 134. This operation serves to reduce conduction losses on the phase leg by not conducting through two of the inverter switches during the boost mode, and dissipates the loss in the first switch 156.

Figure 5:
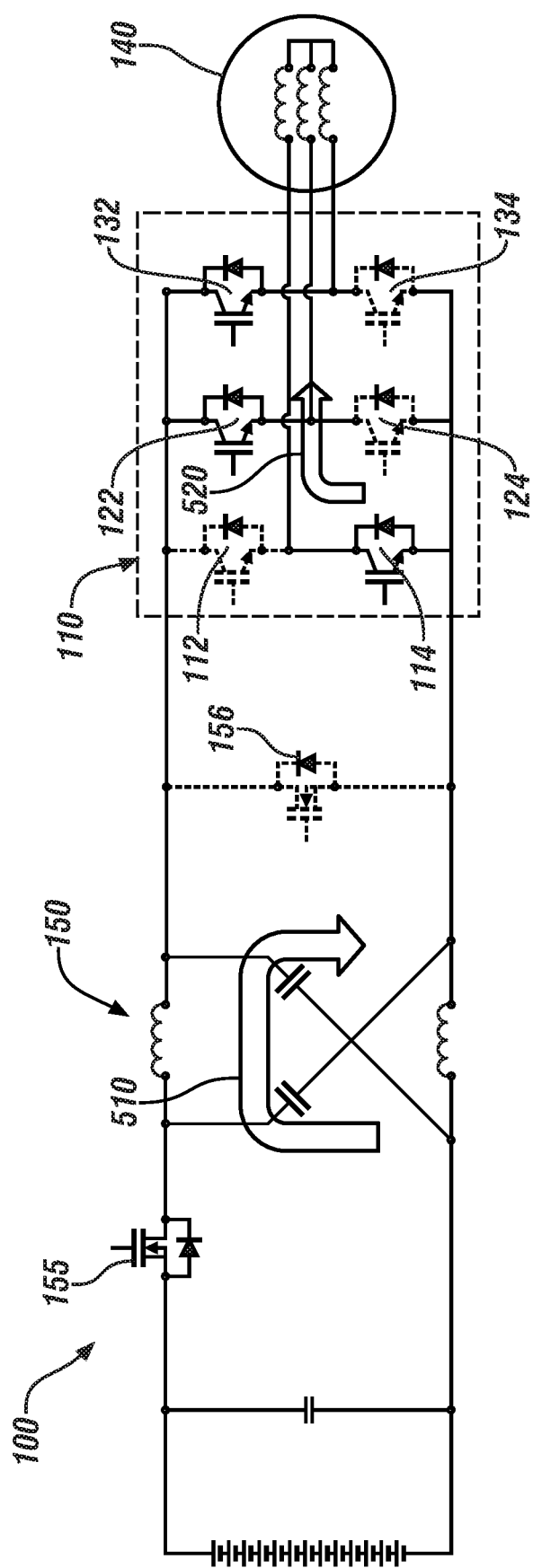
FIG. 5 schematically shows details associated with operating an embodiment of the electric power system in a third state, in accordance with the disclosure.

FIG. 5 schematically shows details associated with operating an embodiment of the electric power system 100 in a third state associated with the boost mode. In the third state, the first switch 156 is deactivated and the second switch 155 is activated, thus effecting charging of the Z source inverter 150 during this portion of the boost mode. The first inverter switches 112, 122 and 132 and the second inverter switches 114, 124 and 134 are selectively activated as part of motor control modulation. Arrow 510 indicates power flow through the Z-source inverter 150, and Arrow 520 indicates power flow through the activated second inverter switch 114. This operation is associated with three-phase motor control modulation. As appreciated, the third state as shown may be labeled as V011 control state, which indicates activations and deactivations of the first inverter switches 112, 122 and 132 and the second inverter switches 114, 124 and 134. Other control states associated with operation in the boost mode relate to activations and deactivations of the first inverter switches 112, 122 and 132 and the second inverter switches 114, 124 and 134 and are designated as V011, V001, V010, V101, V110, V100. The control states are sequentially selected to activate and deactivate the inverter switches 112 and 114, 122 and 124, and 132 and 134 in response to an inverter switch control mode that can include a pulsewidth-modulated (PWM) mode, a six-step control mode or another control mode.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A power inverter system for transferring electric power between a DC power source and a multi-phase electric machine, comprising:
   a power inverter, a Z-source inverter, a first switch, a second switch, and a high-voltage bus including positive and negative conductors; and
   a bus capacitor arranged between the positive and negative conductors of the high-voltage bus and arranged between the Z-source inverter and a DC power source;
   wherein the first switch is arranged between the positive and negative conductors of the high-voltage bus electrically coupled to the DC power source; and
   wherein the second switch is arranged in-line on the positive conductor of the high-voltage bus.

2. The power inverter system of claim 1, further comprising the first switch being arranged between the positive and negative conductors of the high-voltage bus, and between the power inverter and the Z-source inverter.

3. The power inverter system of claim 1, wherein the Z-source inverter comprises:
   a first inductor arranged in line in the positive conductor of the high-voltage bus;
   a second inductor arranged in line in the negative conductor of the high-voltage bus;
   a first capacitor arranged between a first side of the first inductor and a second side of the second inductor; and
   a second capacitor arranged between a second side of the first inductor and a first side of the second inductor.

4. The power inverter system of claim 1, wherein the second switch is arranged in line in the positive conductor of the high-voltage bus between the bus capacitor and the Z-source inverter.

5. The power inverter system of claim 1, wherein the first switch comprises an Insulated Gate Bipolar Transistor (IGBT).

6. The power inverter system of claim 1, wherein the first switch comprises a gallium nitride (GaN) transistor.

7. The power inverter system of claim 1, wherein the first switch and the second switch comprise gallium nitride (GaN) transistors.

8. The power inverter system of claim 1, wherein the first switch and the second switch comprise silicon carbide (SiC) transistors.

9. The power inverter system of claim 1, further comprising a gate driver circuit operatively connected to the power inverter, and a controller operatively connected to the gate driver circuit, the first switch, and the second switch.

10. The power inverter system of claim 9, wherein the controller is operatively connected to the gate driver circuit, the first switch, and the second switch to control the power inverter system in a normal mode, a boost mode, or a regenerative braking mode.

11. The power inverter system of claim 10, wherein the controller operative to control the power inverter system in the normal mode comprises the controller operative to control the first switch in an OFF state.

12. The power inverter system of claim 10, wherein the controller operative to control the power inverter system in the boost mode comprises the controller operative to actively control the first switch.

13. The power inverter system of claim 12, wherein the controller is operative to control a pulsewidth modulated duty cycle of the first switch, wherein the pulsewidth modulated duty cycle is selected to achieve a desired voltage level on the high-voltage bus.

14. The power inverter system of claim 10, wherein the controller operative to control the power inverter system in the regenerative braking mode comprises the controller operative to actively control the first switch and control the second switch in an ON state.

15. A power inverter system for transferring electric power between a DC power source and a multi-phase electric machine via a high-voltage bus, the power inverter system comprising:
   a power inverter, a Z-source inverter, and a switch; and
   a bus capacitor arranged between the positive and negative conductors of the high-voltage bus and arranged between the Z-source inverter and the DC power source;
   wherein the switch is configured, when the power inverter system is connected to the high-voltage bus, to be arranged between positive and negative conductors of the high-voltage bus; and
   wherein the switch is arranged between the power inverter and the Z-source inverter.

16. The power inverter system of claim 15, wherein the Z-source inverter comprises:
   a first inductor arranged in line in the positive conductor of the high-voltage bus;
   a second inductor arranged in line in the negative conductor of the high-voltage bus;
   a first capacitor arranged between a first side of the first inductor and a second side of the second inductor; and
   a second capacitor arranged between a second side of the first inductor and a first side of the second inductor.

17. The power inverter system of claim 15, wherein the switch comprises a silicon carbide (SiC) transistor.

18. The power inverter system of claim 15, further comprising a gate driver circuit operatively connected to the power inverter, and a controller operatively connected to the gate driver circuit, and the switch.

19. The power inverter system of claim 18, wherein the controller operative to control the power inverter system in a boost mode comprises the controller operative to control a pulsewidth modulated duty cycle of the switch, wherein the pulsewidth modulated duty cycle is selected to achieve a desired voltage level on the high-voltage bus.

20. A power inverter system for transferring electric power to a multi-phase electric machine, comprising:
   a power inverter, a Z-source inverter, a first switch, a second switch, and a high-voltage bus including positive and negative conductors that are electrically coupled to a DC power source; and
   a bus capacitor arranged between the positive and negative conductors of the high-voltage bus and arranged between the Z-source inverter and the DC power source;
   wherein the first switch is arranged between the positive and negative conductors of the high-voltage bus electrically coupled to the DC power source; and
   wherein the second switch is arranged in-line on the positive conductor of the high-voltage bus between the bus capacitor and the Z-source inverter.

* * * * *